United States Patent [19]

Kerr et al.

[11] 4,302,042
[45] Nov. 24, 1981

[54] SHEET TRANSPORTER

[75] Inventors: Thomas P. Kerr; John K. Kreitler, both of Festus, Mo.

[73] Assignee: PPG Industries, Inc., Pittsburgh, Pa.

[21] Appl. No.: 103,961

[22] Filed: Dec. 17, 1979

[51] Int. Cl.³ ............................................. B66C 1/22
[52] U.S. Cl. .............................. 294/67 AB; 294/67 R
[58] Field of Search ............... 294/63 R, 67 R, 67 A, 294/67 AA, 67 AB, 67 B, 67 BB, 67 D, 67 DA, 67 DB, 67 E, 74, 81 R, 82 R, 87 R, 103 R, 104

[56] References Cited

U.S. PATENT DOCUMENTS

| | | | |
|---|---|---|---|
| 1,525,146 | 2/1925 | Owen | 294/67 AB |
| 1,753,578 | 4/1930 | Raymond | 294/104 X |
| 2,801,876 | 8/1957 | Palmer | 294/103 R |
| 2,978,270 | 4/1961 | Verheggen | 294/67 AB |
| 3,427,066 | 2/1969 | Kugler | 294/67 R |
| 3,838,779 | 10/1974 | Dawson | 294/67 BB |
| 3,913,965 | 10/1975 | Muller et al. | 294/67 AB X |

FOREIGN PATENT DOCUMENTS 1082577 9/1967 United Kingdom .......... 294/67 AA

Primary Examiner—Johnny D. Cherry
Attorney, Agent, or Firm—Donald Carl Lepiane

[57] ABSTRACT

A sheet transporter has a rectangularly shaped frame having a sheet receiving surface, a pair of sheet retainers mounted adjacent the top corner of the frame to maintain the sheets toward the sheet receiving surface, laterally moveable sheet support member adjacent bottom corners of the frame and a lifting bail having an adjustable elongated member mounted to the frame with the longitudinal axis of the elongated member and sheet receiving surface of the frame subtending an oblique angle.

10 Claims, 13 Drawing Figures

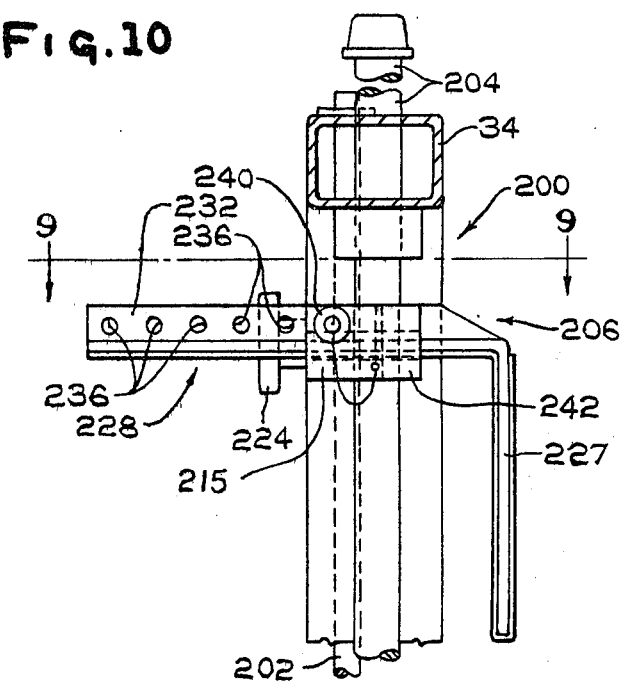
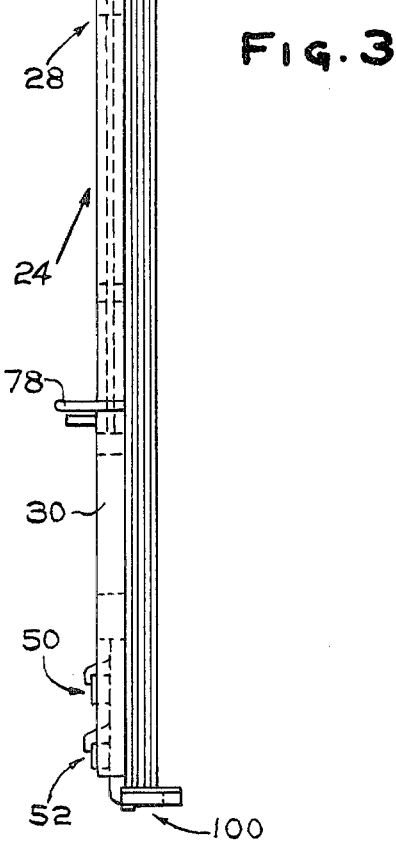
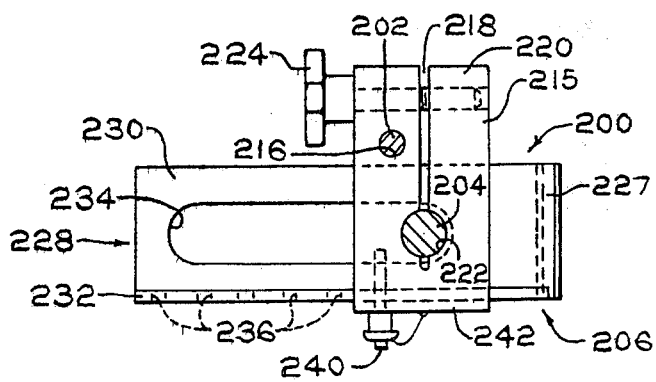

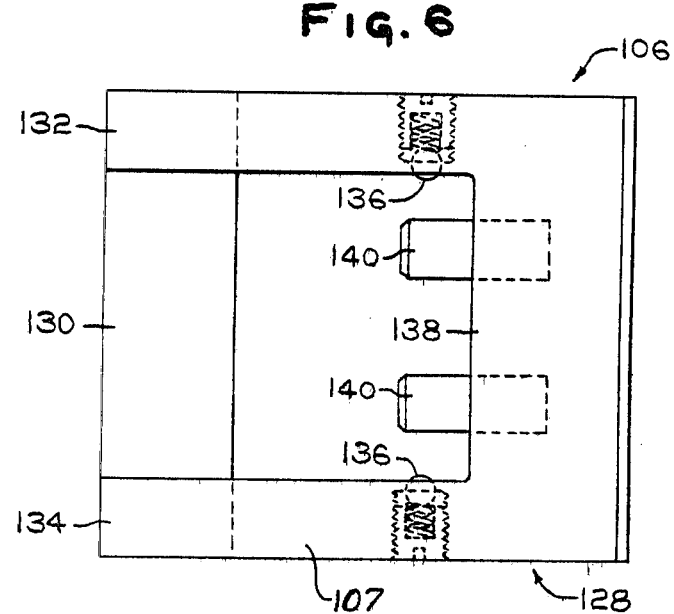
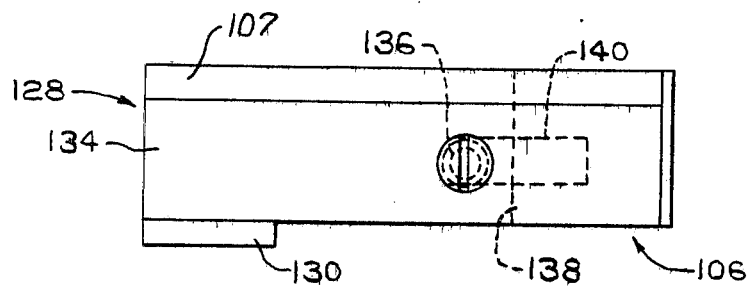
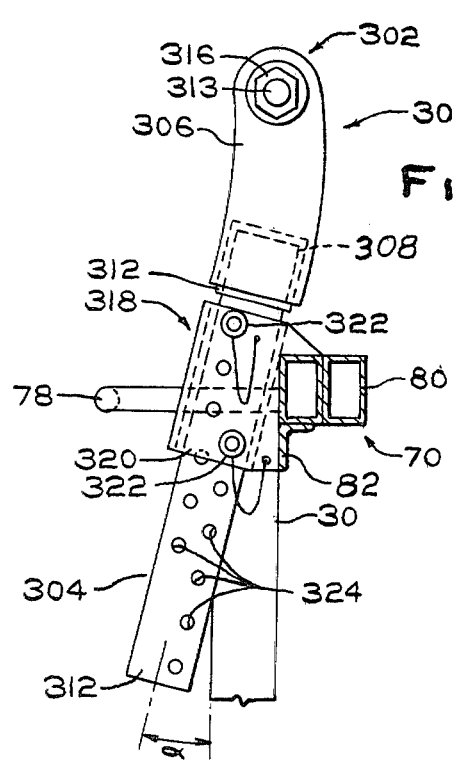
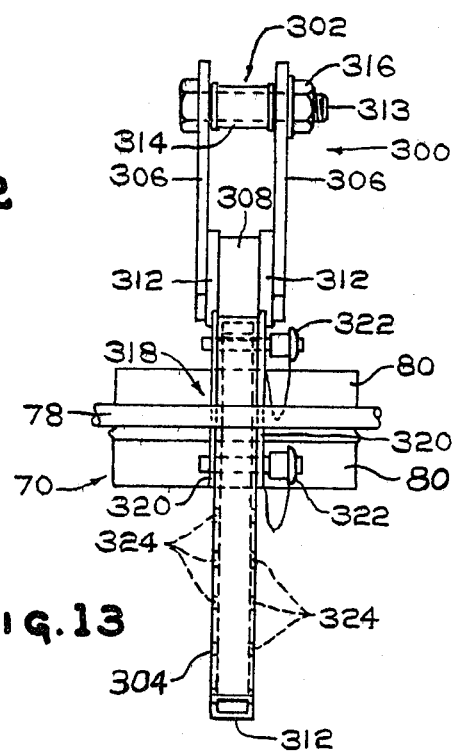

SHEET TRANSPORTER

BACKGROUND OF THE INVENTION

1. Field of the Invention

This invention relates to a sheet handling or transporting device or frame.

2. Discussion of the Prior Art and Technical Problems.

In the prior art there are available slings and frames for handling sheets, e.g. glass sheets. U.S. Pat. No. 4,066,287 teaches a pair of slings spaced from one another on a spreader bar. Each of the slings has a half bridle for engaging sides of the sheets and a shoe for supporting the bottom edge of the sheets. A limitation of the sling assembly of the above-identified patent is that there are no provisions for supporting the sheet between the slings to prevent bowing of the sheets. U.S. Pat. No. 3,8383,779 teaches a glass plate transporter having a rigid frame. The frame is loaded with glass sheets and thereafter the sides of the sheets engaged by fingers to secure the sheets on the frame. The loaded frame is lifted to the vertical position and the sheets transferred from the transporter to a sling and bar assembly for example of the type taught in the above-mentioned patent. Although the transporter is acceptable for its intended purpose, it is not easily adapted for loading sheets thereon when in a vertical position.

As can now be appreciated it would be advantageous to provide a sheet handling or transporting device or frame that does not have the limitations of the prior art sheet transporters and sling and bar assemblies.

BRIEF DESCRIPTION OF THE DRAWING

FIG. 3 is a side elevated view of the sheet transporter shown in FIG. 1;

FIG. 6 is a top elevated view of a shoe extension mountable on the bottom sheet supporting member shown in FIGS. 4 and 5 for increasing the sheet supporting surface;

FIG. 7 is a side elevated view of the shoe extension shown in FIG. 6;

FIG. 9 is a view taken along lines 9—9 of FIG. 10;

FIG. 10 is a side elevated view of a top sheet retainer having portions removed for purposes of clarity;

FIG. 12 is a side elevated view having portions removed for purposes of clarity illustrating the lifting bail; and FIG. 13 is a front elevated view of the lifting bail shown in FIG. 12.

SUMMARY OF THE INVENTION

This invention relates to a sheet support for a sheet transporter of the type having a sheet receiving surface. The sheet support includes a member having a sheet supporting surface lying in a plane generally normal to the sheet receiving surface of the transporter and mounted for movement along a reciprocating path generally parallel to the sheet receiving surface of the transporter. Facilities are provided to secure the member in a preselected position along the reciprocating path.

This invention also relates to a lifting bail for the sheet transporter. The lifting bail includes a collar mounted on the transporter with the longitudinal axis of the collar and the receiving surface of the transporter subtending an oblique angle.

Still further, this invention relates to a sheet transporter including a frame having a right side, left side, top end and bottom end, to define a sheet receiving surface therebetween. A sheet retainer to maintain the sheets against the receiving surface of the frame is mounted at each of the right and left sides adjacent the top end of the frame. A sheet support of the type discussed above is mounted on the frame at each of the right and left sides adjacent the bottom end. The sheet supports are mounted for movement toward and away from their adjacent right and left side of the frame.

DETAILED DESCRIPTION OF THE INVENTION

Figure 2:
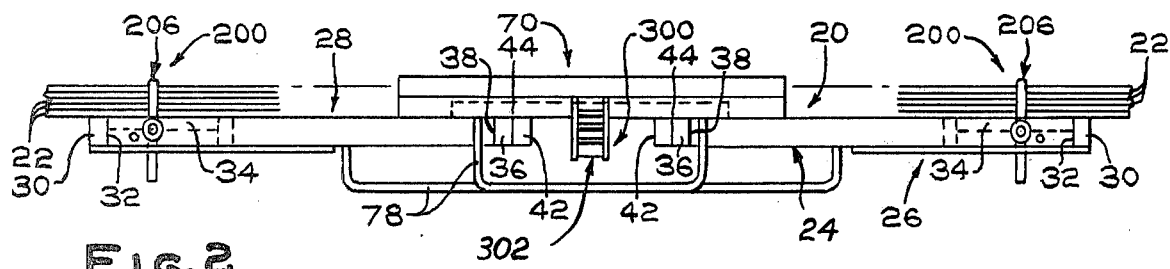
FIG. 2 is a top view of the sheet transporter shown in FIG. 1.
Figure 1:
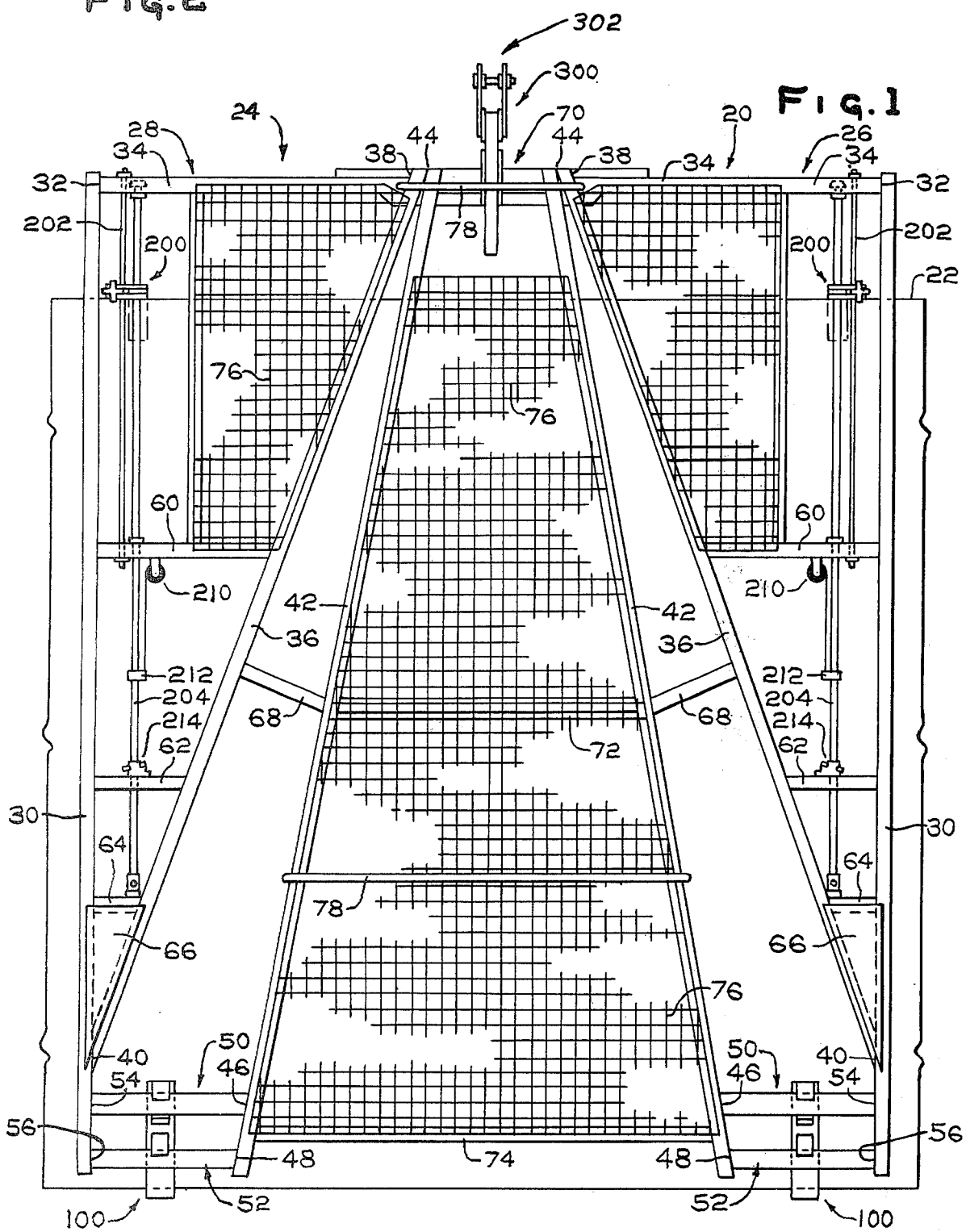
FIG. 1 is a back elevated view of the sheet transporter of the instant invention.

In FIGS. 1-3 there is shown sheet transporter or transporting device 20 of the instant invention for lifting and/or transporting sheets 22. The transporter 20 includes adjustable bottom sheet supports 100; adjustable top sheet retainers or finger assembly 200 and adjustable lifting bail 300 mounted on frame 24 in a manner discussed below. The frame 24 is preferably made of rigid light weight structural members secured together in any convenient manner e.g. by welding and in any convenient configuration to provide a structurally stable frame while minimizing the weight of the frame. Shown in FIGS. 1-3 is a construction used which is presented for illustration purposes only and is not limiting to the invention.

With reference to FIG. 1 and for ease of discussion, the frame 24 has a right frame section 26 joined to left frame section 28. The sections 26 and 28 are identical in construction and unless indicated otherwise are made of 2 inches (5.08 centimeters) by 3 inches (7.62 centimeters) hollow steel tubing having a wall thickness of about 3/16 inch (0.47 centimeter). Each of the frame sections 26 and 28 as viewed in FIG. 1 includes a vertical strut 30 about 13 feet, ¾ inch (1.67 meters) long joined at 32 to top horizontal strut 34 having a length of about 3 feet, 11 inches (1.19 meters). A first slanting strut 36 having a length of about 11 feet, 8 inches (3.55 meters) is joined at 38 to the top horizontal strut 34 and at 40 to the vertical strut 30. A second slanted strut 42 having a length of about 12 feet, 4 inches (3.76 meters) is joined at 44 to the first slanting strut 36 and at 46 and 48 to guiderails 50 and 52, respectively of the bottom sheet edge supports 100. The guiderails 50 and 52 have their other end joined to the vertical strut 30 at 54 and 56 respectively as shown in FIG. 1. A triangular shaped steel gusset plate 66 having a thickness of about ¼ inch (0.64 centimeters) overlays inner horizontal strut 64 and a portion of the vertical strut 30 and the first slanted strut 36 as shown in FIG. 1. A slanted strut 68 having a length of about 14 inches (35.6 centimeters) is joined at its ends to the first slanted strut 36 and the second slanted strut 42 as shown in FIG. 1. The right and left sections 26 and 28 respectively are interconnected by a strut assembly 70 to be discussed in more detail below and struts 72 and 74 (see FIG. 1) having a length of 3¾ feet (1.14 meters) and 5⅔ feet (1.73 meters), respectively. A screen 76 is secured over the back surface of the frame 24 in any convenient manner to prevent debris from falling on the area below when the frame is transporting glass sheets. A pair of spaced handles 78 one secured at its ends to the second slanted strut 42 and the other upper handle secured at its ends to the first slanted strut 36 of the right and left frame sections 26 and 28, respectively, can be used to guide the frame e.g. as the sheets 22 are transported between predetermined locations.

Figure 4:
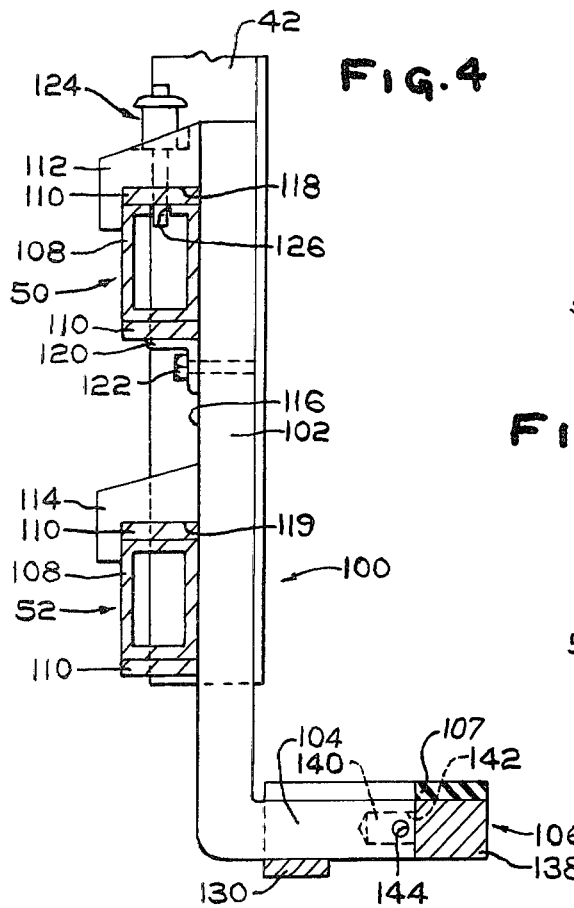
FIG. 4 is a side elevated view of the sheet transporter having portions removed for purposes of clarity to illustrate bottom sheet supporting member.
Figure 5:
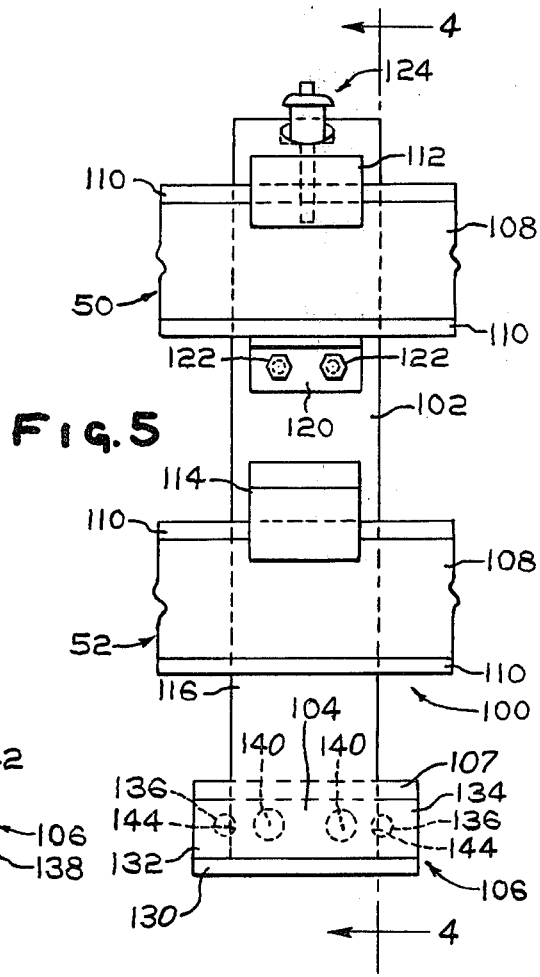
FIG. 5 is a front elevated view having portions removed for purposes of clarity illustrating the bottom sheet supporting member.

Referring now to FIGS. 4 and 5 the bottom edge supports 100 each have a vertical arm member 102 conveniently supported on the guiderails 50 and 52 with the arm member 102 secured to horizontal arm member 104 for supporting the bottom edge of the glass sheets 22 as mounted on the frame 24. The bottom edge supports 100 are slidable on their respective guiderails 50 and 52 to adjust the spacing between the bottom edge supports 100 for lifting glass sheets of different lengths as measured between their sides. An extension 106 shown in FIGS. 6 and 7 is mountable on the horizontal arm member 104 of the bottom edge supports 100 to alter e.g. increase supporting area of the bottom edge supports 100. A construction of guiderails 50 and 52; sheet bottom edge support 100 and shoe extension 106 used with the frame discussed above is shown in FIGS. 4-7. Referring now to FIGS. 4 and 5, the guiderails 50 and 52 are each made of hollow tubing 108, 2 inches (5.08 centimeters) by 3 inches (7.62 centimeters) having a wall thickness of about 3/16 inch (0.47 centimeters). The tubing 108 for the guiderail 50 has a length of about 2 feet (0.6 meters) and the tubing 108 for the guiderail 52 has a length of about 1 foot 9½ inches (0.55 meters). Each tubing 108 is additionally supported by a steel plate 110 having a thickness of about ⅜ inch (0.95 centimeter) and a width of about 2 inches (5.08 centimeters) secured to each of the narrow sides of the tubing 108 along its length as shown in FIGS. 4 and 5.

The sheet bottom edge supports 100 are made of sheel having a thickness of about 1½ inches (3.81 centimeters) and a width of about 4 inches (10.16 centimeters). The vertical arm member 102 has a length of about 17¾ inches (0.45 meters) and the horizontal arm member 104 has a length of about 5⅞ inches (14.92 centimeters). Guiderail engaging members 112 and 114 each made of steel having a thickness of between about 1 inch to 1½ inches are mounted on the back surface 116 of the vertical arm member 102 to form a groove 118 and 119 for receiving the guiderail 50 and 52 respectively as shown in FIG. 4. The bottom sheet edge supports 100 are secured on their respective guiderails 50 and 52 by a 1½ inches (3 centimeters) by 1½ inches (3 centimeters) by ¼ inch (3.17 centimeters) angle iron 120 having a length of about 3 inches (7.62 centimeters). The angle iron 120 is mounted on the back surface 116 of the vertical arm member 102 by nut and bolt assembly 122 as shown in FIGS. 4 and 5 to maintain the guiderail 50 in the groove 118 of the engaging member 112. The sheet bottom edge supports are secured in spaced relation to one another on their guiderails 50 and 52 by a ball lock pin 124 mounted in the top guiderail engaging member 112 and passing into a selected one of a plurality of spaced holes 126 (one only shown in FIG. 4) in the guiderail 50.

Referring to FIGS. 4-7 the foot extension 106 has a generally U-shaped body member 128 having a bottom plate 130 secured to outer legs 132 and 134. Each of the outer legs 132 and 134 is provided with a spring biased ball plunger 136 with the center leg 138 provided with a pair of dowels 140 each having a length of about 2 inches (5.08 centimeters) and a diameter of about ¾ inch (1.90 centimeters). The extension 106 is mounted on the horizontal arm member 104 by passing the horizontal arm member 104 between the outer legs 132 and 134 to move the dowels 140 of the extension 106 into holes 142 (one only shown in FIG. 4) formed in the horizontal arm members 104. The ball of the spring biased ball plunger 136 is captured in corresponding hole 144 formed on each side of the horizontal arm member 104. As viewed in FIG. 4, the plate 130 assists in preventing clockwise motion of the extension 106 by the sheets supported by the center leg 138 of the extension 106.

Figure 8:
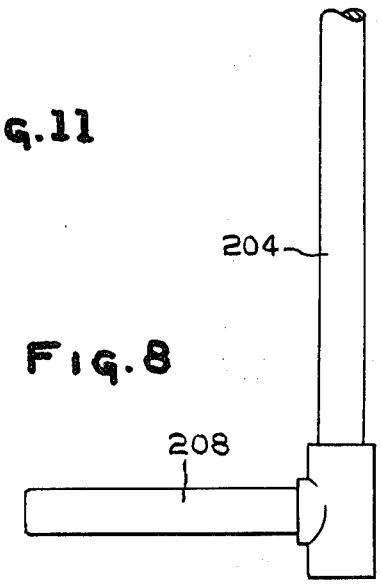
FIG. 8 is a handle assembly for moving a retainer for engaging top portions of the sheets loaded on the transporter.

The adjustable top sheet edge retainers 200 shown in FIG. 1 are preferably constructed for ease of movement toward the top sheet edge to engage the top sheet portions and away from the top sheet edge to disengage the top sheet portions. A construction of a top sheet retainer 200 used with the previously discussed frame 24 includes a guidebar 202 secured between the horizontal strut 34 and the horizontal strut 60 in any convenient manner. A lifting rod 204 having a sheet engaging assembly 206 (see FIG. 3, 9 or 10) mounted thereon in a manner to be discussed below is mounted for reciprocal motion through the struts 34, 60 and 62. Hand lever 208 (see FIG. 8) moves the rod 204 upward as viewed in FIG. 1 with the biasing action of spring 210 to move the sheet engaging assembly 206 away from the top portions of the sheet 22 and moves the rod 204 downward against the biasing action of spring 210 to move the sheet engaging assembly into engagement with the top portion of the sheets. The spring 210 is conveniently mounted on the strut 60 and secured to the lifting rod 204 by collar 212. The rod 204 is secured against motion by pipe clamp 214 such as the type sold by McMasters, Carrier No. 5063A11 mounted on the strut 62.

Figure 11:
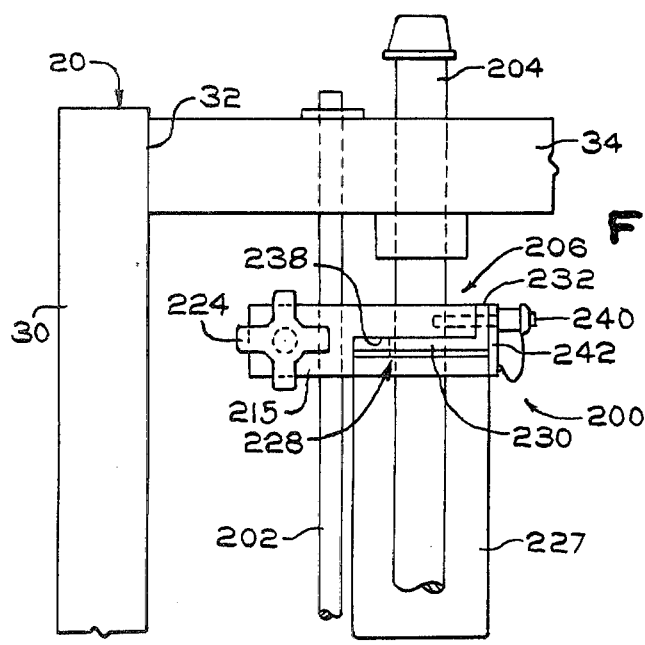
FIG. 11 is a back view of the sheet retainer having portions removed for purposes of clarity.

With reference to FIGS. 9-11 and in particular to FIG. 9 the finger engaging assembly 200 includes a plate 215 having a width of about 2½ inches (6.35 centimeters) a thickness of about 1½ inches (5.7 centimeters), a length of about 5¼ inches (13.34 centimeters) and hole 216 for slideably receiving the guidebar 202. The plate 215 has a groove 218 formed therein extending from side 220 and terminating in hole 222 for receiving the lifting rod 204. Rotating hand knob assembly 224 decreases the spacing between walls of the groove 218 to secured the plate 215 on the lift rod 204 in any predetermined position to accommodate various heights of sheets as loaded.

The sheet engaging assembly 206 includes a rigid vertical arm 227 having a thickness of about ¼ inch (0.6 centimeters) a length of about 6 inches (15.24 centimeters) and a width of about 3 inches (7.62 centimeters) for engaging the sheets. The arm 227 is secured to horizontal arm 228 having a base plate 230 and a side plate 232. The base plate 230 has a thickness of about ¼ inch (0.6 centimeter); a length of about 14¼ inches (0.39 meters); a width of about 3 inches (7.62 centimeters) and a groove 234 having a width of about 1¼ inches (3.18 centimeters) and a length of about 6½ inches (16.51 centimeters). The side plate 232 has a height of about ⅜ inch (1.9 centimeters), a thickness of about ¼ inch (0.64 centimeter) and a plurality of spaced holes 236. A cut out portion 238 in the plate 215 slideably receives the horizontal arm 228 (see FIG. 11) with the lifting rod 204 passing through groove 234 of the base plate 230 of the horizontal arm 228 (see FIG. 9). The horizontal arm 228 is adjusted to space the vertical arm 227 from the frame for decommodating various sheet pack thicknesses by a ball lock pin 240 mounted in side wall 242 of the plate 215 and passing through one of the holes 236 of the side plate 232.

With reference to FIGS. 1–3 and specific reference to FIGS. 12 and 13, the adjustable lifting bale 300 preferably includes a hook receiving member 302 mounted on an adjustable shaft 304 angled relative to the frame 24 as shown in FIG. 3. A construction of an adjustable bale 300 used for lifting sheets shown in FIGS. 12 and 13 includes a pair of steelplates 306 having a thickness of about ⅝ inch (1.27 centimeters), a width of about 4 inches (10.16 centimeters) and a length of about 10 inches (25.4 centimeters) joined to reinforced end 308 of 2 inches by 3 inches steel tubing having a wall thickness of 3/16 inch (0.47 centimeters). The tubing end 308 is reinforced by a pair of ⅝ thick steel plates 312 as shown in FIGS. 12 and 13. The hook receiving member 302 includes a steel sleeve 314 (shown only in FIG. 13) having a diameter of about 2 inches (5.08 centimeters) on a 1¼ inches (3.18 centimeters) diameter A-490 heavy structural bolt 313. The bolt 313 posses through the plates 306 and sleeve 314 and is secured in place by nut 316. The shaft 304 is slidably mounted in a steel collar 318 having a wall thickness of about ¼ inch (0.64 centimeter) and a length of about 6⅝ inches (16.8 centimeters). The side plates 320 of the collar 318 engage strut assembly 70 (to be discussed below) with the longitudinal axis of the collar 318 subtending an oblique angle with the plane of the frame of about 50° (see FIG. 3). The shaft 304 is adjustable and secured in position by a pair of ball lock pins 322 passing through one plate 320 of the collar 318 through one of a plurality of holes 324 in each side of the shaft 304 and through the other plate 320 of the collar 318 as shown in FIGS. 12 and 13.

The strut assembly 70 is structurally stable to support the weight of the lifting bale 300 and the shock imparted thereto during the lifting of the frame. A strut assembly construction used in the practice of the invention includes a pair of hollow 2 inches (5.08 centimeters) by 3 inches (7.62 centimeters) steel tubes 80 and having wall thickness of about 3/16 inch (0.48 centimeters) and welded together and joined at their ends to the adjacent horizontal strut 34 as shown in FIGS. 1 and 2. The hollow tubes 80 have a length of about 4 feet (1.2 meters) so that approximately 1½ feet (0.45 meter) of each end extends onto the adjacent horizontal strut 34. A 1½ inches (3.81 centimeters) by 2 inches (5.08 centimeters) by ¼ inch (0.64 centimeter) angle iron 82, 2 feet, 9 inches (0.84 meter) long is welded to the tubes and to the adjacent slanting struts 36 and 42.

The transporter 20 of the instant invention is used for transporting glass sheets having a length of about 130 inches (3 meters) and a height of about 96 inches (2.4 meters) as mounted on the transporter. The sheets may be transported to a particular location in any convenient manner which is not limiting to the invention. With reference to FIG. 1 the bottom support edges are spaced about 60 inches (1.5 meters) apart. The thickness of the plurality of loose sheets to be transported is approximately 3 inches (7.62 centimeters) and does not require the extension 106 shown in FIGS. 6 and 7. The vertical arm 227 of the sheet engaging assembly 206 is extended about 3½ inches (9 centimeters) and the assembly raised upward as viewed in FIGS. 1 and 3 by the lift rod 204. The frame 24 is moved against the glass sheets after which the clamp 214 is depressed and the lift rod moved downward to move the sheet engaging assembly about the upper portion of sheets. The loaded frame is lifted by crane hook (not shown) engaging the bail 300 to move the loaded frame to a predetermined location where the sheets are unloaded in a generally reverse manner in which the sheets were loaded.

As can be appreciated, the invention is not limited to the types of sheets that may be transported. For example, the sheets may be glass sheets, wooden sheets or metal sheets. Further, areas of the transporter contacting the sheets, e.g. glass sheets may be covered with a resilient material, e.g. rubber 107 as shown in FIG. 4 for the foot extension 106. In addition the examples presented above are for illustration purposes only and are not intended to limit the invention.

What is claimed:

1. A sheet transporter comprising:
   a frame having a right side, a left side, a top end and a bottom end to define a sheet receiving surface therebetween;
   sheet retaining means mounted on said frame adjacent each of said right and left sides and adjacent said top end of said frame;
   means mounting said sheet retaining means for moving said sheet retaining means toward and away from the sheet receiving surface;
   means mounting said sheet retaining means for moving said sheet retaining means along a reciprocating path between said top end and said bottom end and for biasing said sheet retaining means in a first direction along the reciprocating path;
   first means acting on said moving means for securing said sheet retaining means in a preselected position relative to the sheet receiving surface;
   second means acting on said moving and biasing means for securing said sheet retaining means at a preselected position in the reciprocating path;
   at least one guiderail mounted adjacent each of said right and left sides of said frame with its longitudinal axis generally parallel to said bottom end;
   a pair of sheet support means each having a sheet supporting surface;
   means including a groove mounting each of said sheet support means for slidably mounting a sheet supporting means on a respective one of said at least one guiderail with the sheet supporting surface of said sheet supporting means generally normal to said sheet receiving surface and parallel to the bottom edge of said frame; and
   means for securing each one of said sheet support means in a preselected position on its respective one of said at least one guiderail.

2. The sheet transporter as set forth in claim 1 wherein each of said sheet retaining means includes:
   a plate;
   said moving and biasing means moves said plate along the reciprocating path;
   a sheet engaging member mounted to said plate;
   said moving means moves said sheet engaging member toward and away from said sheet receiving surface; and said first securing means secures said sheet engaging member in a preselected position relative to said sheet receiving surface.

3. The sheet transporter as set forth in claim 1 further including:
a lifting bail comprising:
a collar having a longitudinal axis;
means for mounting said collar on said frame intermediate the right and left sides with the longitudinal axis of said collar and the sheet receiving surface of said frame subtending an oblique angle;
a rigid elongated member slideably mounted in said collar; and
means for securing said elongated member in said collar at one of a number of positions.

4. A sheet transporter comprising:
a frame having a right side, a left side, a top end, and a bottom end to define a sheet receiving surface therebetween;
sheet retaining means mounted at each of the right and left sides adjacent said top end to maintain the sheets toward the sheet receiving surface of said frame;
said sheet retaining means includes:
a plate;
means for mounting said plate to move along a first reciprocating path between the top and bottom ends;
a sheet engaging member mounted to said plate and moveable toward and away from said sheet receiving surface;
means for securing said sheet engaging member in a preselected position relative to said sheet receiving surface;
means for biasing said plate in a first direction along the first reciprocating path; and
means for securing said plate in a predetermined position along the first reciprocating path;
a sheet support mounted at each of the left side and right side adjacent the bottom end of said frame, each of said sheet supports including:
a member having a sheet supporting surface lying in a plane generally normal to the sheet receiving surface, said member of each of said sheet supports includes;
a first arm having said sheet receiving surface; and
a second arm normal to the first arm; and;
means for mounting said member to said frame for movement along a second reciprocating path between the right and left sides of the frame; said mounting means of each of said sheet supports includes;
at least one guiderail mounted to said frame with the longitudinal axis generally parallel to the bottom end;
said second arm having at least one groove for receiving said at least one guiderail;
means for securing said member of said sheet support in one of a number of preselected positions along the second reciprocating path between the right and left sides of said frame, said securing means includes a pin for locking said second arm on said at least one guiderail at a selected location.

5. A sheet transporter comprising:
a frame having a right side, a left side, a top end, and a bottom end to define a sheet receiving surface therebetween;
sheet retaining means mounted at each of the right and left sides adjacent said top end to maintain the sheets toward the sheet receiving surface to said frame;
a sheet support mounted at the left side and right side adjacent the bottom end of said frame, each of said sheet supports including;
a member having a sheet supporting surface lying in a plane generally normal to the sheet receiving surface; and
means for mounting said member to said frame for movement along a reciprocating path defined as a second reciprocating path between the right and left sides of the frame; and
means for securing said member of said sheet support in one of a number of preselected positions along the second reciprocating path between the right and left sides of the frame; and
a lifting bail comprising:
a collar having a longitudinal axis;
means for mounting said collar on the sheet transporter intermediate the right and left sides with the longitudinal axis of said collar and the sheet receiving surface of said frame subtending an oblique angle;
a rigid elongated member slidably mounted in said collar; and
means for securing said elongated member in said collar at one of a predetermined number of positions.

6. The sheet transporter as set forth in claim 4 or 5 wherein said mounted means of said sheet retaining means includes:
a rod slidably mounted in the top end of said frame for movement along the first reciprocating path toward and away from the top end of said frame; and
means for detachably securing said plate on said rod;
said biasing means of said sheet retaining means include:
a spring mounted on said frame and connected to said rod; and
said securing means of said sheet retaining means include a clamp mounted on said frame and acting on said rod.

7. The sheet transporter as set forth in claim 6 wherein said sheet retaining means further includes:
a first arm member having a sheet contacting surface generally parallel to said sheet receiving surface of said frame; and
a second arm member joined to said first arm member and mounted to said plate to move said first arm member toward and away from the sheet receiving surface of said frame.

8. The sheet transporter as set forth in claim 7 wherein said sheet retaining means includes:
a guiderod secured to said frame between said plate with said sheet engaging member of said sheet retaining means mounted on said guiderod.

9. The sheet transporter as set forth in claim 8 wherein each of said sheet supports includes:
means detachably secured to said first arm for altering supporting surface of each of said sheet supports.

10. The sheet transporter as set forth in claim 9 wherein the sheets are glass sheets and areas contacting the sheets have resilient surfaces.

* * * * *

UNITED STATES PATENT AND TRADEMARK OFFICE
CERTIFICATE OF CORRECTION

PATENT NO. : 4,302,042

DATED : November 24, 1981

INVENTOR(S) : Thomas P. Kerr et al.

It is certified that error appears in the above-identified patent and that said Letters Patent are hereby corrected as shown below:

Column 6, Claim 1, line 31, delete "supporting" and insert --support--;

Column 8, Claim 5, line 6, delete "to" and insert --of--.

Signed and Sealed this

Sixteenth Day of February 1982

[SEAL]

Attest:

GERALD J. MOSSINGHOFF

Attesting Officer     Commissioner of Patents and Trademarks